(12) United States Patent
Berg et al.

(10) Patent No.: US 6,698,610 B2
(45) Date of Patent: *Mar. 2, 2004

(54) TRIPLE WALLED UNDERGROUND STORAGE TANK

(76) Inventors: Robin Berg, 1088 Nelson Farm Rd., Hudson, WI (US) 54016; John Burwell, 1005 Danbury Ct., Eagan, MN (US) 55123; Albert F Dorris, 5721 View La., Edina, MN (US) 55436; John Smith, 15632 Cornell Trail, Rosemont, MN (US) 55068

( * ) Notice: Subject to any disclaimer, the term of this patent is extended or adjusted under 35 U.S.C. 154(b) by 0 days.

This patent is subject to a terminal disclaimer.

(21) Appl. No.: 10/084,091

(22) Filed: Feb. 28, 2002

(65) Prior Publication Data

US 2002/0084276 A1 Jul. 4, 2002

Related U.S. Application Data

(63) Continuation of application No. 09/014,629, filed on Jan. 28, 1998.

(51) Int. Cl.$^7$ ................................................ B65D 88/00
(52) U.S. Cl. ................. 220/62.19; 220/565; 220/567.1; 220/567.2
(58) Field of Search ............................. 220/565, 567.1, 220/567.2, 4.13, 62.19, 62.11; 73/49.2; 405/55

(56) References Cited

U.S. PATENT DOCUMENTS

| | | |
|---|---|---|
| 662,217 A | 11/1900 | Brady |
| 673,073 A | 4/1901 | Boberick |
| 1,993,730 A | 3/1935 | Carpenter |
| 3,265,236 A | 8/1966 | Gibbon et al. |
| 3,400,849 A | 9/1968 | Pottier et al. |
| 3,489,311 A | 1/1970 | Folkerts et al. |
| 3,655,086 A | 4/1972 | Trenner |
| 3,695,050 A | 10/1972 | Bancroft |
| 3,806,391 A | 4/1974 | Clay et al. |
| 3,913,341 A | 10/1975 | Katsuta |
| 3,930,375 A | 1/1976 | Hofmann |
| 4,366,917 A | 1/1983 | Kotcharian |
| 4,739,659 A | 4/1988 | Sharp |
| 4,875,361 A | 10/1989 | Sharp |
| 4,923,081 A | 5/1990 | Weaver et al. |
| 4,925,046 A | 5/1990 | Sharp |
| 4,936,705 A | 6/1990 | Schneider |
| 4,948,007 A | 8/1990 | Berg et al. |
| 4,951,844 A | 8/1990 | Sharp |
| 4,958,957 A | 9/1990 | Berg et al. |
| 4,974,739 A | 12/1990 | Gelin |

(List continued on next page.)

FOREIGN PATENT DOCUMENTS

| | | | |
|---|---|---|---|
| DE | 517917 | | 1/1933 |
| DE | 543209 | | 10/1980 |
| GB | 683855 | | 12/1952 |
| WO | 95/23749 | * | 9/1995 |

Primary Examiner—Nathan J. Newhouse
Assistant Examiner—Joseph C. Merek
(74) Attorney, Agent, or Firm—Piper Rudnick LLP; Steven B. Kelber

(57) ABSTRACT

A triple-walled underground storage tank is provided with primary, secondary and tertiary walls. Between each two adjacent walls, an annular space is provided. The annular space is continuous throughout, and permits the flow of liquid therein. Monitors may be provided separately for each annulus, to detect the formation of leaks, or a lack of containment, in either wall defining the annular space. In one embodiment, the tertiary wall is a smooth cylinder formed about the circumferential ribs of the secondary wall. In the alternative embodiment, the rib-bearing wall is the tertiary wall, and the walls and annular materials of the tank are formed within a female mold. In either case, a tank prepared from integral ribs, with superior robustness and strength, is provided with triple containment.

8 Claims, 14 Drawing Sheets

U.S. PATENT DOCUMENTS

| | | |
|---|---|---|
| 4,989,447 A | 2/1991 | Gelin |
| 4,989,750 A * | 2/1991 | McGarvey ............. 220/560.01 |
| 5,017,044 A | 5/1991 | Sharp |
| 5,020,358 A | 6/1991 | Sharp |
| 5,220,823 A | 6/1993 | Berg et al. |
| 5,224,621 A | 7/1993 | Cannan, Jr. et al. |
| 5,232,119 A | 8/1993 | Kaufmann |
| 5,346,570 A | 9/1994 | Warden et al. |
| 5,534,318 A | 7/1996 | Andre De La Porte et al. |
| 5,544,974 A | 8/1996 | Berg et al. |
| 5,564,588 A * | 10/1996 | Reese ......................... 220/565 |
| 5,590,803 A | 1/1997 | Kaempen |
| 5,595,456 A | 1/1997 | Berg et al. |
| 5,597,948 A | 1/1997 | Sharp |
| 5,645,231 A | 7/1997 | Smith |
| 5,720,404 A | 2/1998 | Berg et al. |
| 5,803,304 A | 9/1998 | Berg |
| 6,102,241 A * | 8/2000 | Palazzo ....................... 220/586 |
| 6,161,493 A | 12/2000 | Berg, Sr. |
| 6,167,608 B1 | 1/2001 | Burwell et al. |
| 6,280,614 B1 | 8/2001 | Berg et al. |
| 6,398,057 B1 * | 6/2002 | Berg et al. ............... 220/62.19 |

* cited by examiner

FIGURES 11A-G

TRIPLE WALLED UNDERGROUND STORAGE TANK

This application is a Continuation of application Ser. No. 09/014,629 filed Jan. 28, 1998, the entirety of which is incorporated herein by reference.

BACKGROUND OF THE INVENTION

1. Field of the Invention

This invention pertains to underground storage tanks for the storage of liquids in general, and in particular chemicals, and most particularly, fuels such as gasoline, diesel fuel, heating fuel and the like, as well as petroleum products such as machine and lubricating oils. These tanks are adapted to contain liquids underground, and dispense them, through a pump, to a distant location, such as the nozzle of a gasoline pump at a gas station. Specifically, the invention contemplates a triple walled tank, with an inner or primary wall, a secondary wall and an annulus between the primary and secondary wall, and an outer or tertiary wall, with an annulus between the second and tertiary walls.

2. Background of the Prior Art

Commercially, underground storage tanks have been in use in the United States for over one hundred years. With the development of a nationwide road system, and reliance on the automobile and related transportation, gasoline service stations were widely developed. Although not the sole site for use of underground storage tanks, typically, gasoline at a service station is held in underground storage tanks and dispensed through above-ground facilities. This invention focuses on the structure of these underground storage tanks, which can also be used to store chemicals and other liquids, but find a principal application in the storage of liquid fuels.

Initially, storage tanks were constructed of steel. The use of steel presents a problem of corrosion, however, with failure of containment likely over a long term of service. This failure became even more likely if the hole where the tank was situated was a "wet" hole, that is one filled with water, or typically, brine, a highly corrosive fluid. This problem spurred the development of corrosion-resistant tanks constructed of fiberglass and resin, generally referred to as fiber reinforced plastic, or FRP. Xerxes Corporation, a leader in fiberglass reinforced plastics, and its predecessor, introduced FRP underground storage tanks (storage tanks, herein) in the 1970's, along with Owens Corning Fiberglass.

While FRP tanks provide resistance to corrosion, failure of any tank, due to mechanical weakness, impact, etc. presented the possibility of environmental contamination of the area surrounding the storage tank, as well as an expensive cleanup. A response to this concern was the introduction of the "double walled" FRP tank, in which two concentric walls, separated by an annulus in which some form of leak detection monitor was provided, were employed to provide back-up protection. Leakage in either the inner or outer wall was detected through an alarm means, or monitor, and provided the opportunity to locate and repair the damage before penetration of both walls could occur. The first such double wall FRP tank was commercially introduced by Xerxes Corporation in 1984.

Double wall storage tanks, particularly of FRP construction, have since received substantial attention in the patent literature. Among patents commonly assigned herewith are U.S. Pat. No. 5,544,974, directed to an optimized service station installation, and U.S. Pat. No. 5,595,456, directed to the provision of a water-tight riser for a double walled FRP storage tank.

U.S. Pat. Nos. 5,220,823; 4,988,447 and 4,974,739; address double walled underground storage tanks where the annular space between the inner and outer wall provides flow through of liquids therein, but provides for some strength sharing between the two walls. U.S. Pat. Nos. 5,020,358; 5,017,044; 4,825,046; 4,875,361 and 4,739,659, all commonly assigned herewith, address different solutions to the need to provide for dual containment of the interior fluid, monitoring of the integrity of the tanks, and ease of construction.

Typically, a double walled FRP storage tank is built using either "male" or "female" construction. In the male method, the tanks is formed about a rotating mandrel, with a layer of FRP material formed on the outer surface of a cylindrical mandrel. Reinforcement ribs, to provide hoop strength, and resistance to buckling, are formed on the first or primary FRP layer, and adhered thereto through a secondary bond. In a double walled tank, a layer of annular material is placed over some or all of this rib bonded primary wall, and then a secondary wall of FRP material is formed on top of the annular material. Although originally, the second wall touched the tops of the ribs and spanned the distance therebetween, spaced from the region of the primary tank between the ribs, or "flats", as illustrated in U.S. Pat. Nos. 4,781,777 and 4,679,093, this created an annulus of substantial volume. As a "wet" annulus, that is one where the annular space is filled with a leak detecting fluid such as brine, became increasingly popular, the weight of the annular fluid in these tanks became significant, and a contour following tank was developed, where the annular material, and the secondary containment tank, follow the general contour of the primary tank ribs and flats.

In the female method, the tank is formed inside of a mold, rather than on a mandrel. The mold has ribs provided in it, giving rise to a monolithic or primary bond between the flats and the ribs—they are co-formed and co-cured. This gives rise to a more robust tank, with substantial structural integrity. In nearly thirty years of commercial use, not one tank of this type, manufactured by Xerxes Corporation, has failed due to lack of mechanical strength. In this system, the annular material is applied to the inside of the outer wall, and then the substantially cylindrical inner wall is formed on the inside of the annular layer. U.S. patent application Ser. No. 08/705,765, allowed, discloses this method of tank construction, where the annular material is reduced to a Mylar film, or PVA and wax in the dome shaped ends. The entire disclosure of this application is incorporated hereinby-reference.

Recently, increasing population pressure, and recognition of the sensitivity of sources of water to environmental pollution, have given rise to requests from government and private interests to provide even greater security than those offered by commercially available double walled underground storage tanks, including FRP tanks, currently available from Xerxes corporation and Containment Solutions. Enhanced, or triple wall protection, has been requested by various local governments, including those concerned about the safety of the San Antonio, Tex. aquifer, and San Francisco, Calif. Currently no triple wall tank is available, nor is a double wall tank readily available to be combined with existing technology to provide such triple wall technology.

SUMMARY OF THE INVENTION

The above-stated goals, including the provision of a triple walled tank for additional security of containment of fluids within the primary tank, is provided by combining technologies proven over time in separate tanks, so as to provide an internal or primary tank, with a secondary tank surrounding the primary tank, and an annular material spacing the two apart. A tertiary tank is placed surrounding the secondary tank, and again, an annular space is created between the secondary and tertiary tanks.

The structure can be provided in either of two embodiments. In the first embodiment, the primary and secondary tank, with the annulus there between, are built in a fashion identical to that disclosed in U.S. patent application Ser. No. 08/705,765. Specifically, the outer or secondary tank is formed on the interior of a female mold, with a mylar film or other separating material applied along the flats of the interior of the secondary tank. A layer of unidirectional fabric, or "uni" is placed over the open ends of the ribs formed in the secondary tank, and coated with FRP materials, to seal the rib. In at least three points around the circumference of the tank, "gutters" of dimensionally stable material which permits the flow of liquid longitudinally are installed, connecting each annular space and the space within each rib, by punching holes in the overlaying material. Thereafter, the interior, or primary tank of FRP materials is "sprayed up", or formed on the interior of the annular material. Each tank is formed from two half-shells, each with a closed, dome-shaped end. The primary and secondary tanks are separated, in the dome, by application of a polyvinyl alcohol (PVA)/wax combination, insuring the flow of liquid between these walls in the dome. The two half shells are then married, and secured by an overlay of FRP material on either side of the joint.

In a first embodiment, a tertiary wall is provided with an annulus between the secondary wall and itself, by forming a smooth cylinder which rests on, and in preferred embodiments, is secured, to the tops of the ribs of the secondary containment wall. This tertiary wall is preferably formed by wrapping Bayex® or similar FRP supporting fabric about the exterior of the tank, from rib top to rib top, and then "spraying over" or applying resin or fiber reenforced plastic there over, and allowing the same to cure. The tertiary wall defines annular chambers between each adjacent pair of ribs. To provide for fluid communication between the chambers, an insert is provided at one or two locations along the rib, on the top of the rib, providing for flow between adjacent annular chambers.

In an alternate embodiment, the double walled half shells, with an annulus there between, are not removed from the mold. In this embodiment, the outer most wall formed against the mold interior surface becomes the tertiary wall, and the wall previously formed becomes the secondary wall. A second annular material is applied to the inner surface of the secondary wall, and secured thereto, typically by providing resin to adhere the annular material to the interior wall by providing a tacky surface. Against the interior of this second annulus, a primary wall is built, creating a half-cylinder in each mold half. Two mold halves are then married to form a single tank.

In either embodiment, the reenforcing ribs, necessary for buckling resistance and hoop strength, are integrally formed with the wall with which they are associated (either the secondary or tertiary wall, in the first or second embodiments, respectively). This provides for a strong, robust and durable tank. In preferred embodiments, there is a bond between each of the walls, either directly, or through a strength-sharing, load transmitting annular material. Each annulus is provided with a leak detection system, so that leakage through any of the three walls can be detected quickly, and repaired without loss of containment.

BRIEF DESCRIPTION OF THE DRAWINGS

The underground storage tank of this application is more completely understood with reference to the attached drawings.

DETAILED DESCRIPTION OF THE INVENTION

This invention is directed to a triple walled underground storage tank comprised substantially of fiber reenforced plastic materials. Typically, these materials comprise a curable resin, reenforced by fibers of fiberglass, or similar reenforcement material. Such materials are conveniently "sprayed" up on a receiving surface, and cure in place, by use of a "chopper" gun. One such device is disclosed in U.S. Pat. No. 5,654,231, which is incorporated herein-by-reference. Although operated by a controller, the process of fabricating underground storage tanks through the use of female molding technologies can be semi-automated by use of an apparatus and process of the type disclosed in U.S. Pat. No. 4,363,687, also incorporated herein-by-reference. In general, female molding technology calls for the placement of a female mold with a desired configuration of ribs and flats on a roller bed, which rotates the mold, which corresponds to a half-shell, at a suitable speed.

The operator, from within the mold on a platform extended therein, sprays the mixture of fiberglass and resin, through the chopper gun, on to the interior of the mold surface. The mold surface is prepared, prior to spraying, with a mold release agent, to provide for ease of separation of the cured product from the mold. In a process, such as that contemplated herein, particulary thick layers, such as the walls themselves, may be completed through two or more passes, since application of the entire thickness in one pass will lead to the formation of bubbles and potentially pin hole leaks as the FRP material cures.

Any of a wide variety of resins may be employed. These typically include polyester resins, such as vinyl esters and isophthalic polyesters, polyethylene, polypropylene, polyvinyl chloride, polyurethane, epoxy, and other resins. Typically, the material sprayed on also includes a catalyst to induce and accelerate curing. In some cases, the catalyst may be colored, or a colored tracer element introduced with the catalyst, to ensure thorough distribution of the catalyst in the mixture.

Similarly, various grades of fiberglass, as well as other reenforcing fibrous materials, may be employed. Other materials necessary or of value in the fabrication of the underground storage tanks of this invention are described below.

Figure 1:
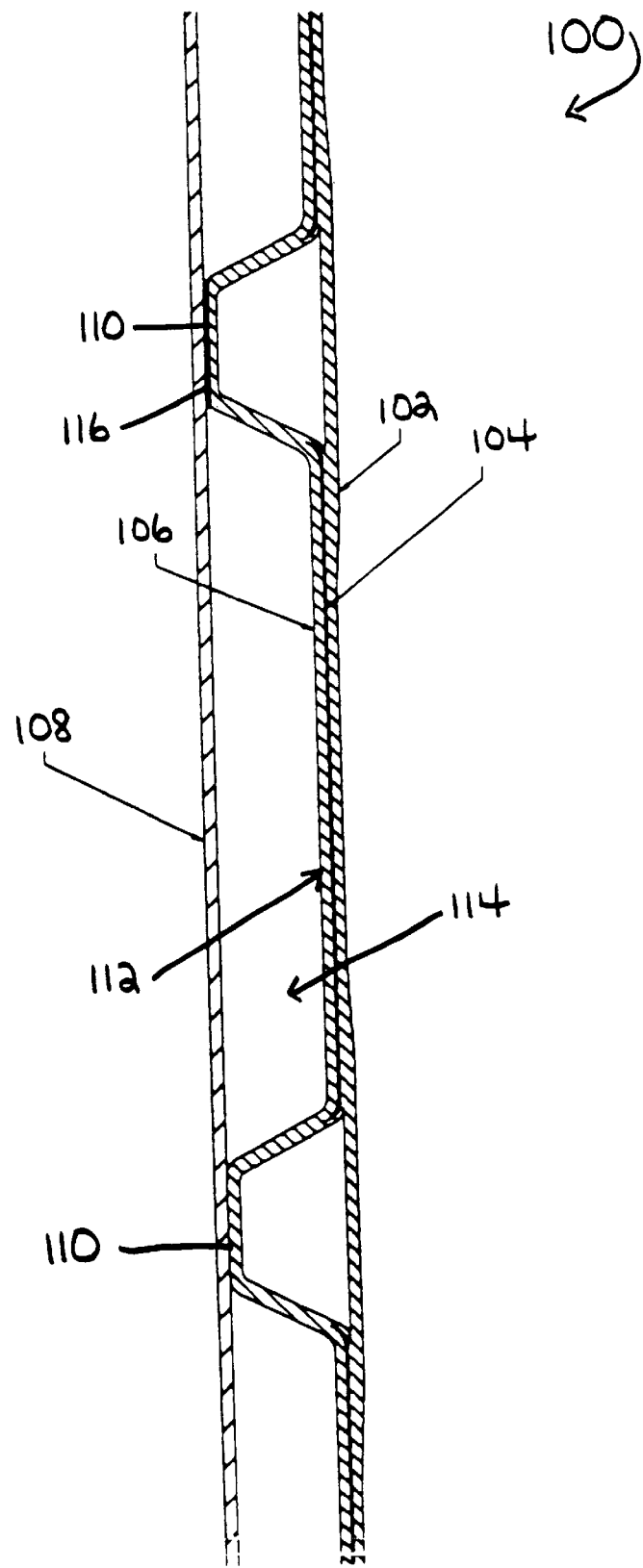
FIG. 1 is a cross section illustrating the typical wall and annulus arrangement of a first embodiment of the tank, taken in longitudinal cross-section.

Referring initially to FIG. 1, a first embodiment of the invention is illustrated in longitudinal cross-section through a portion of the tank between the mid-point, where two half shells are joined, and the end-point, where the tank terminates in a dome-shaped continuous end. Tank 100 is comprised of interior or primary wall 102, which is itself contained by secondary wall 106. Between the two is an annular material 104. This material may be of any of a wide variety of compositions, shapes and textures, as are disclosed in the art discussed herein. In one preferred embodiment, the annular material is a thin mylar or other plastic sheet, as disclosed in allowed U.S. patent application Ser. No. 08/705,765. In this embodiment, the annular material between primary wall 102 and secondary wall 106 serves to provide a space between the walls, wherein liquid flows.

Secondary wall 106 is contained, in turn, by tertiary wall 108. The space between tertiary wall 108 and secondary wall 106 is occupied by annulus 114. The annulus may be filled, partially filled or entirely open. The only requirements for this annular space, if it is filled, is that the material therein permit the passage of water or other fluid, including the fluid to be contained within primary tank 102, in reasonable time. Fluid communication between the annular chambers of annular space 114, defined by adjacent ribs 110, is provided by insert 116. This insert is a small piece of rigid material, either plastic or metal, which is secured to the top of each rib 110 at two or three points along the circumference of the rib, which extends circumferentially all about the tank. This insert 116 is provided with slots which provide for fluid communication between annular chambers 114.

Each of walls 102, 106 and 108 is prepared substantially from fiber reenforced plastic materials, although the method of manufacture of wall 108 is distinct from that of walls 102 and 106.

The structure comprising walls 102, 106 and annular material 104 is fully disclosed in pending U.S. patent application Ser. No. 08/705,765. The resulting tank, without the provision of third wall 108, is commercially sold by Xerxes Corporation and generically referred to as the "DWT-II" tank. In brief, secondary wall 106 is formed against the interior of a female mold which has a corrugated surface defining ribs 110, flats 112 and the spacing there between. This wall may be sprayed up from a mixture of glass fibers and resin, in one or more passes. Thereafter, annular material 104, which may be a mylar film, is applied to the "tacky" resin surface of the interior of secondary wall 106. The mylar or other annular material 104 serves to separate secondary wall 106 from primary wall 102. In an alternate embodiment, a meltable wax or soluble coating such as a polyvinyl alcohol of low saponification is applied to the interior face of the flats of secondary wall 106. Thereafter, primary wall 102 is sprayed up on the surface of this coating. Subsequent to curing of the primary wall, the coating is melted or solubilized, leaving annular space 104, which in this embodiment, is empty.

In the embodiment illustrated in FIG. 1, ribs 110 define an interior space which constitutes part of the annulus. To maintain the ribs open while applying primary wall 102, a layer of unidirectional fabric, typically comprised of fiberglass running the longitudinal direction held in place by secondary fibers, referred to as "uni", is adhered to the "shoulders" of the rib formed in secondary wall 106. FRP material is then sprayed up on the uni fabric and primary wall 102 sprayed up there over. The uni fabric serves as a manufacturing aid only, and does not constitute a structural aspect of the invention. Importantly, in this invention, annular space 104 extends to the rib shoulder, to ensure dual containment between primary tank 102 and secondary tank 106. This permits secondary tank 106 and primary tank 102 to be "bonded" at each foot of ribs 110. In fact, this "bond" forms as a co-cure, and results in a robust tank of significant strength and durability.

Figure 6:
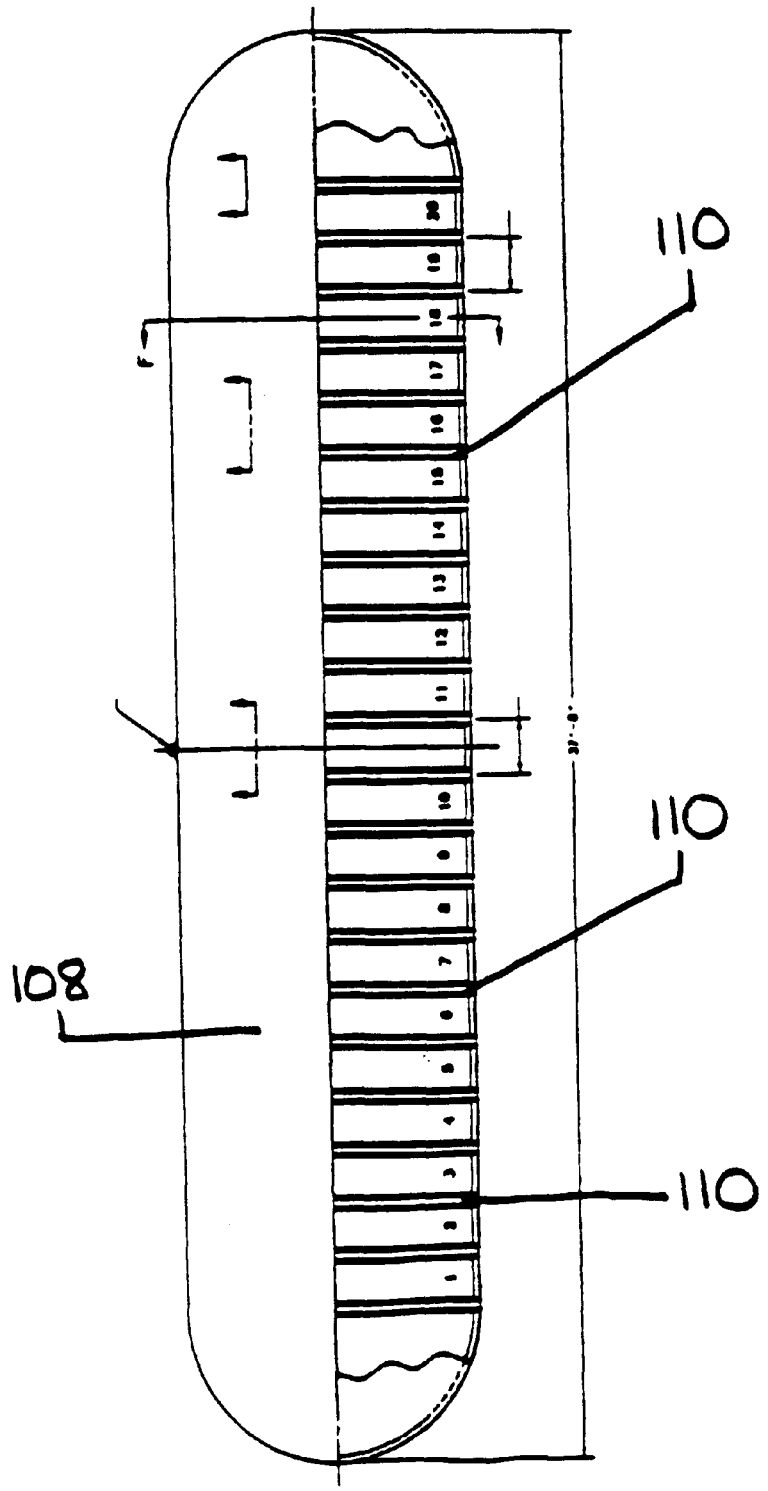
FIG. 6 is a cut away view of the exterior of a first embodiment of the tank.

In this embodiment, tertiary wall 108 is formed by removing the tank already formed from the mold, and applying a supporting fabric or base about the exterior of secondary tank 106. In this case, the tertiary tank is not "contour following" but rather presents a smooth circumference extending the length of the tank. This is most clearly illustrated in cut away in the cut away view illustrated in FIG. 6 where tertiary wall 108 is shown enclosing a tank with twenty ribs 110. While the tertiary wall may be formed separately by female or male molding technology, to avoid the need to observe extremely close tolerances, tertiary wall 108 may be formed by wrapping a supporting fabric, such as fiberglass mesh, available under the mark Bayex®, about the ribs 110. Each piece of Bayex® may be conveniently trimmed to extend from mid-point of a first rib 110 to mid-point of the adjacent rib 110. Once the Bayex® has been secured in place, it is over sprayed with resin or FRP materials, and allowed to cure. On curing, the tertiary wall 108 exhibits some shrinkage, providing for a tight fit. Desirably, however, a secondary bond is provided between tertiary wall 108 and rib surfaces 110 at points other than those occupied by flow through device 116. This is most effectively achieved by sanding the surface of rib 110 prior to application of the Bayex® FRP materials comprising tertiary wall 108.

Figure 2:
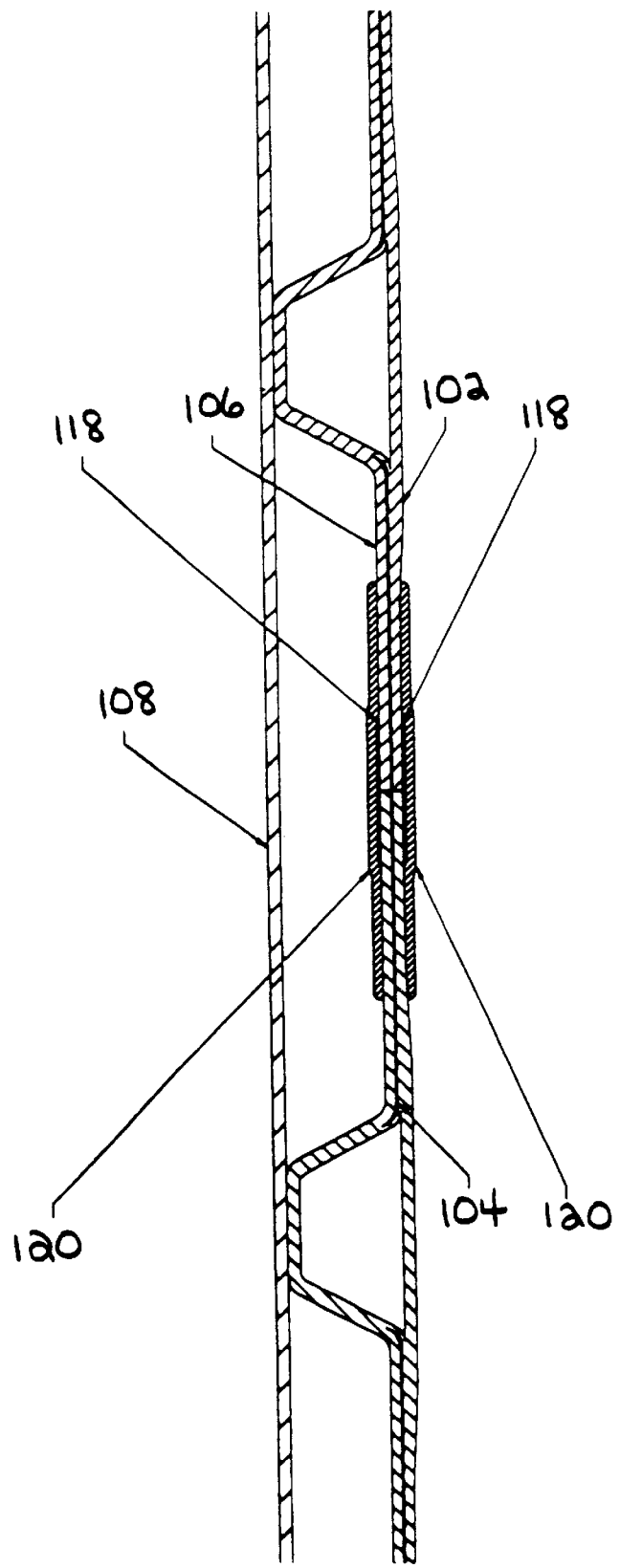
FIG. 2 is a longitudinal cross-section of the wall arrangement of a first embodiment of the tank, illustrating the seam between two half-shells.

As noted, an entire tank is comprised of two half shells, most clearly illustrated in FIG. 2. On completion of the double walled tank comprised of primary wall 102, annular material 104 and secondary wall 106, in two half shells, the tank is removed from the half shells, and two halves brought together on a bed which rotates the shell. An inner seam tab lay-up 118 is applied over the junction between the two half shells. The half shells are married carefully to maintain a continuous annular space 104. The lay-up consists of a fiberglass mat, or glass roving, to which curable resin is applied. As illustrated, the seam lay-up is provided on both the interior and exterior of the tank as formed. Access to the interior may be provided through a manway, discussed, infra. Over lay-ups 118 a seam 120 is provided, again comprised of a glass mat or rovings, provided with resin. Thus, all the structural materials of the tank are comprised of corrosion-resistant FRP-type materials.

Figure 3:
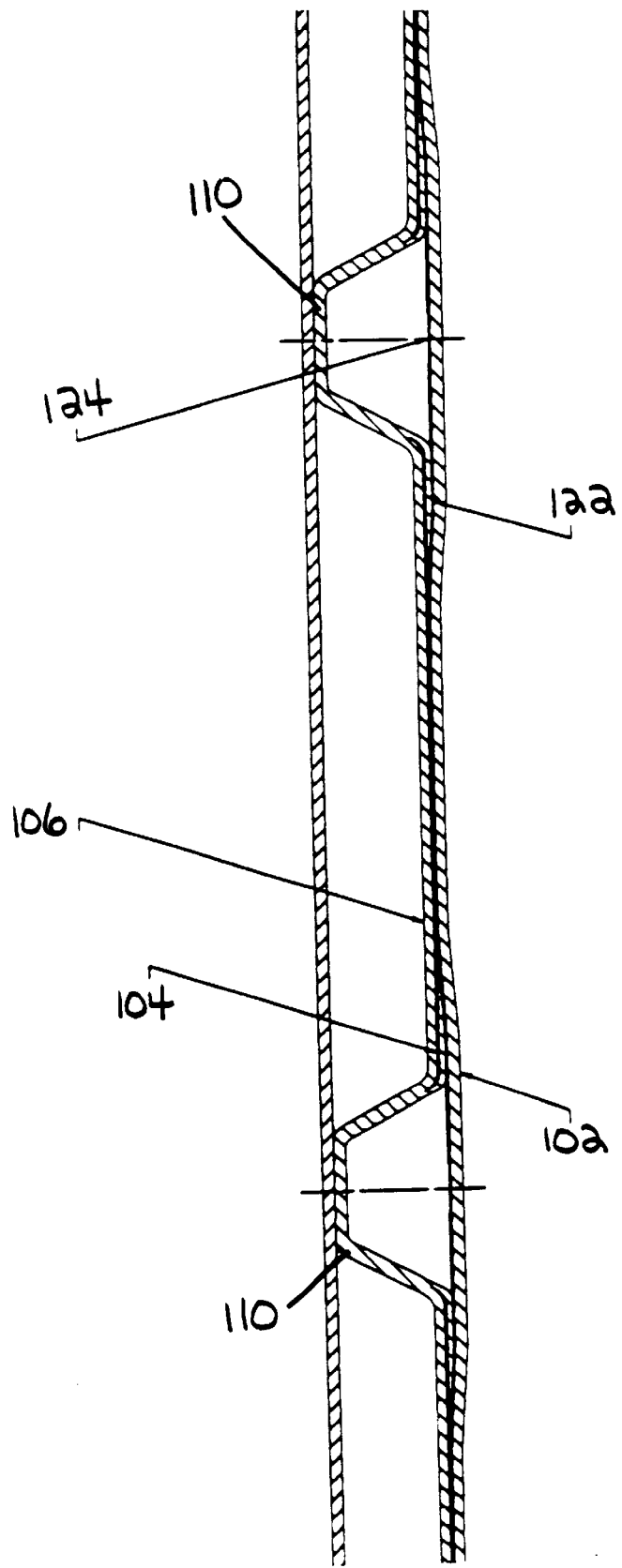
FIG. 3 is a illustration through a longitudinal cross-section of a first embodiment of the tank employing gutters, or other longitudinal flow means, for providing communication between annular spaces in the flats, and the interior of the ribs.
Figure 5:
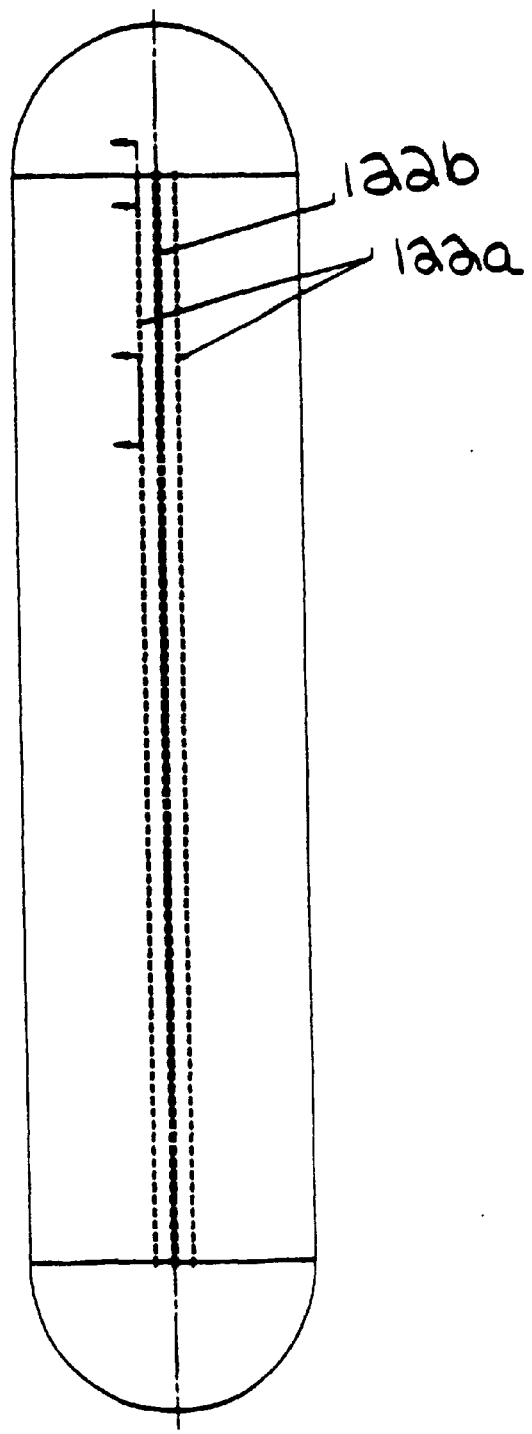
FIG. 5 is a plan illustration of a first embodiment of this tank, illustrating the placement of gutters longitudinally along the tank.

In order to provide for communication through all the rib and flat spaces defining the annulus between primary tank 102 and secondary tank 106, gutters are provided, as most clearly illustrated in FIG. 3. The annular flow material may be any dimensionally stable material that provides for, or allows, liquid to flow longitudinally therein. This material may be mylar, or more rigid materials available to those of skill in the art. In one embodiment, thermal plastic 3-dimensional webbing, produced under the mark Conwed®. Similar materials are also available from Qualis Corporation, a company of Kentucky. As illustrated in FIG. 2, this annular flow material 122 extends along the flat and the rib, linking the spaces contained within ribs 110 with the annular chambers defined by annular material 104. A hole indicated at 124 is punched through the "uni" material described above, so as to ensure complete liquid communication between the space within ribs 110 and the annular space 104. Typically, three gutters are provided, at spaced locations running longitudinally along the tank. The spacing of these gutters is illustrated in FIG. 5. Typically, two gutters will be installed within 20° or so of the "top" of the tank, that portion of the tank which will be provided with fitting extending upwardly when the tank is installed. These gutters 122a are generally narrower than the third gutter which is aligned along the bottom of the tank, indicated at 122b.

Figure 4:
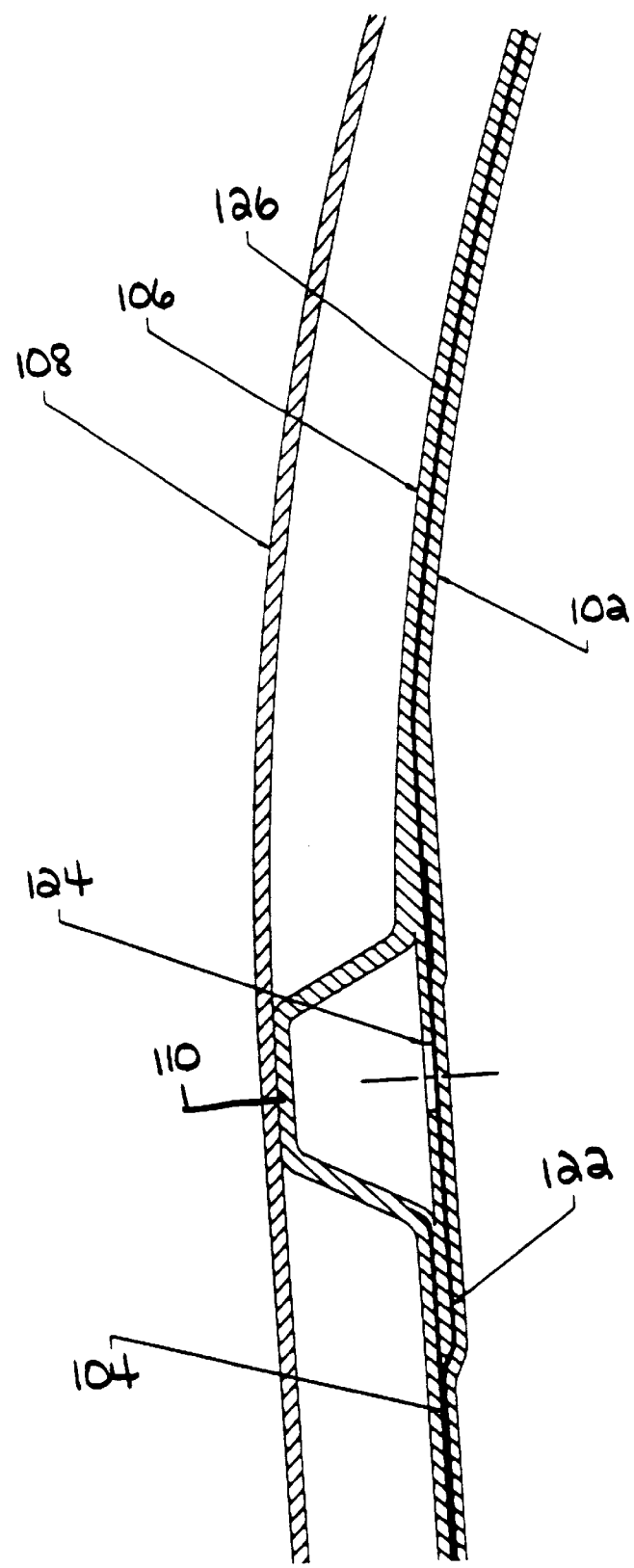
FIG. 4 is an illustration of the juncture between the dome and cylinder walls of a first embodiment of the tank of this invention.

As noted above, the underground storage tank of this invention terminates, in a dome-shaped manner, at both ends. The junction of the last circumferentially extending rib with the structure of the dome is most clearly illustrated in FIG. 4. Terminal rib 110 again overlays a "gutter" or annular flow material strip 122. This communicates with the annular space between primary tank 102 and secondary tank 106, particularly through annular material 104. In the dome, the mylar film or other annular material is replaced with a coating of PVA combined with wax, which coating is removed upon filling the annular space with brine, water or any other liquid. Gutter 122 extends to this point, so that a continuous annulus with fluid communication throughout, extends from one end of the tank to the other. This is important, should a leak of any type develop either in primary tank 102 or secondary tank 106. By filling the annular space there between with brine or some other monitoring fluid, potential leakage can be quickly detected, located and repaired. Even if there should be leakage through both walls 102 and 106, any leakage is contained by tertiary wall 108. Liquid monitoring systems may employ special reservoirs, discussed infra. Instead of a liquid monitoring system, a dry monitoring system may be employed. Such a system may be comprised of a sensor sensitive to the presence of liquid in an annulus which is otherwise intended to be dry, or a pressure system, wherein a low degree of vacuum is drawn on the annulus, which vacuum will be broken upon the formation of leaks or holes in any one of the tanks. The annular space between primary wall 102 and secondary wall 106 is monitored by one device, and a separate device monitors the annulus between tertiary wall 108 and secondary wall 106.

Figure 7:
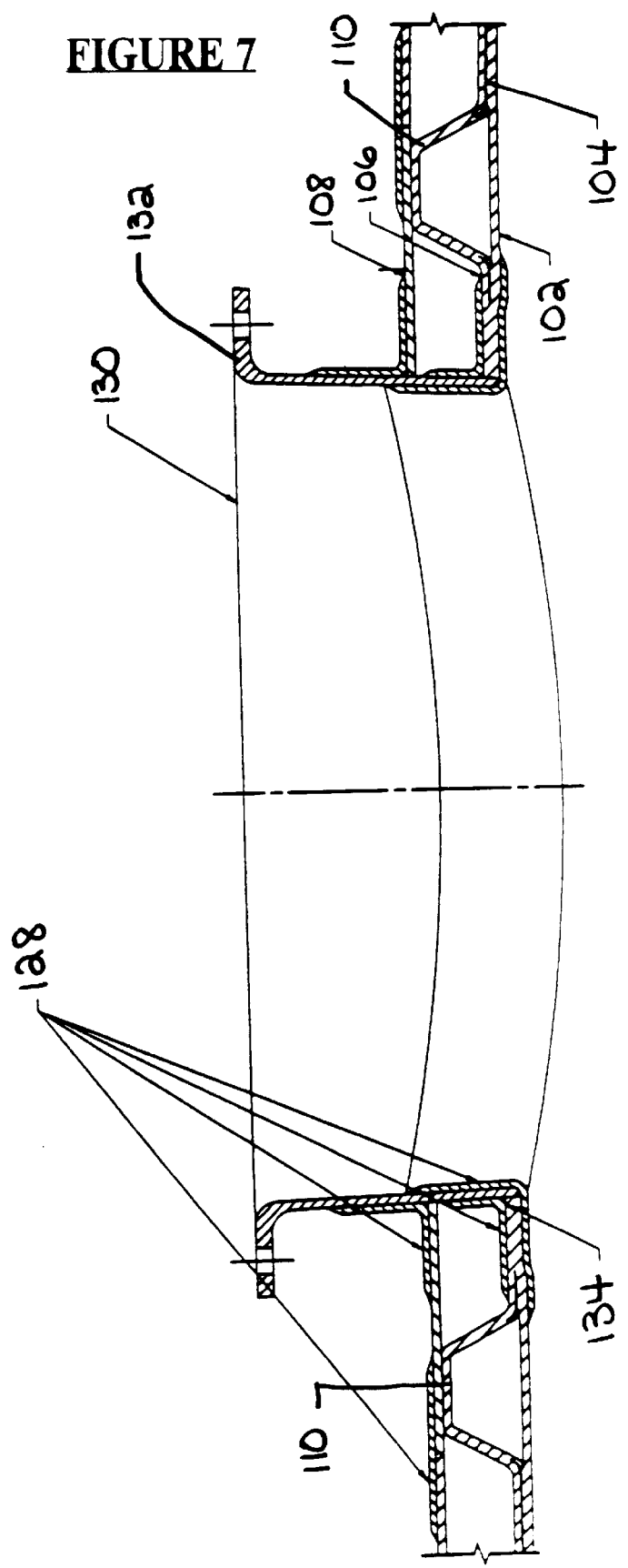
FIG. 7 is an illustration of a manway provided in a first embodiment of a tank through a longitudinal cross-section.

In many tanks of diameter 6 foot or larger, access to the interior is desired, and is provided by a manway. The construction of such a manway is illustrated in FIG. 7. In this illustration, a hole is cut between adjacent ribs 110. The hole is desirably large enough to permit easy access and egress for an adult male. The manway opening is generally indicated at 130. The opening is sealed by manway wall 132, again comprised of FRP materials and constructed on a mold, to form the manway collar. In the alternative, it may be formed in situ, against a temporary form. Manway collar wall 132 is secured to tertiary wall 108, secondary wall 106 and primary wall 102 by the application of lay-ups of fiberglass mat or woven roving, or similar fiberglass fabric, impregnated with resin, providing a corrosion-resistant FRP seal at each joint 128. To ensure there is no leakage or separation at the corners of lay-ups 128, which occur continuously around manway collar 132, putty 134 is installed at the corners. In this way, access to the interior of the tank, without interrupting the triple wall nature of protection, or the annular flow, can be provided.

Figure 8:
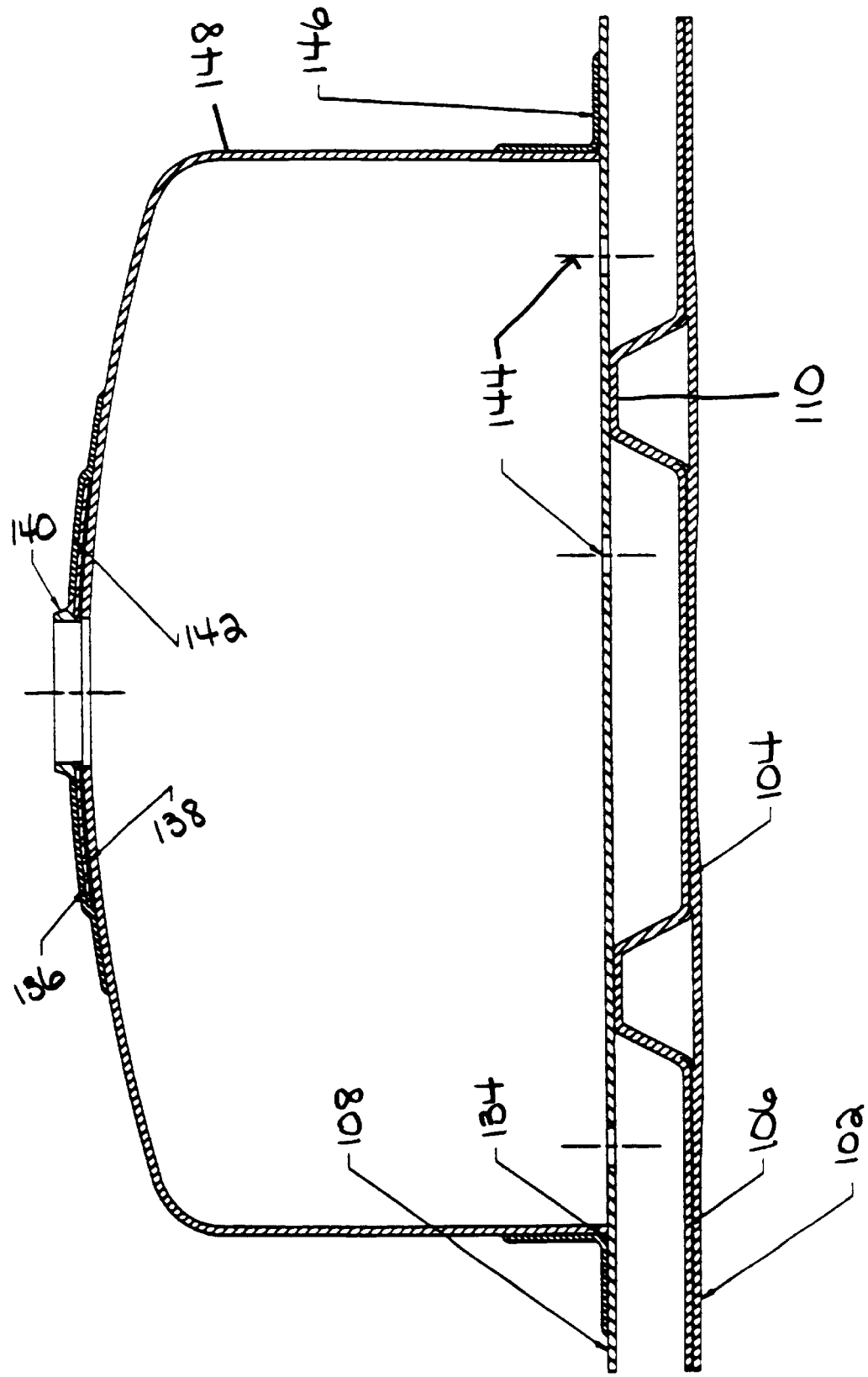
FIGS. 8 and 9 illustrate liquid monitoring reservoirs to detect leakage in either a flat, FIG. 8, or a rib, FIG. 9 in a first embodiment of the tank.

If either annular space 104 or annular space 114, is to be filled, that is a wet to annulus, separate structures have to be provided to provide reservoirs for the brine or other detecting monitor liquid to be provided. A reservoir for annulus 114 is illustrated in FIG. 8. Annulus 114 is of substantial volume in a large tank, and a reservoir is provided so as to adjust for fluctuations in the volume due to the passing of trucks or other loaded vehicles above the tank, the influence of temperature and pressure, etc. Typically, a float valve or other alarm means can be installed within the reservoir, such that either a drop or significant increase in the level in the reservoir triggers an alarm, which can be electronically communicated through the hole in fitting 140, to a remote site which monitors the integrity of the tank 100. Reservoir wall 148 is formed separately on a mold, and applied to the outer surface of tertiary tank 108. As illustrated in FIG. 8, this reservoir spans two ribs 110, but the size will be adjusted to the size of the tank, and the height of the rib, which determines the volume of annulus 114. As with the manway, reservoir wall 148 is bonded to outer wall 110 by lay-ups of glass mat and woven roving, which are impregnated with resin. Again, at corners, to ensure tightness of fit, putty 134 is installed. Holes 144 are provided through tertiary wall 108, to communicate with annulus 114. At the top of the reservoir, a fitting 140 is provided on mounting plate 136 which is secured by resin impregnated mat both below and above the mounting plate at 138 and 142. This process is generally referred to as "glassing in". Annulus 114 and a portion of the reservoir illustrated in FIG. 8 are conveniently filled through fitting 140, which can then be provided with the necessary fixtures to carry electrical contacts for any monitor provided, and any other apparatus desired.

Figure 9:
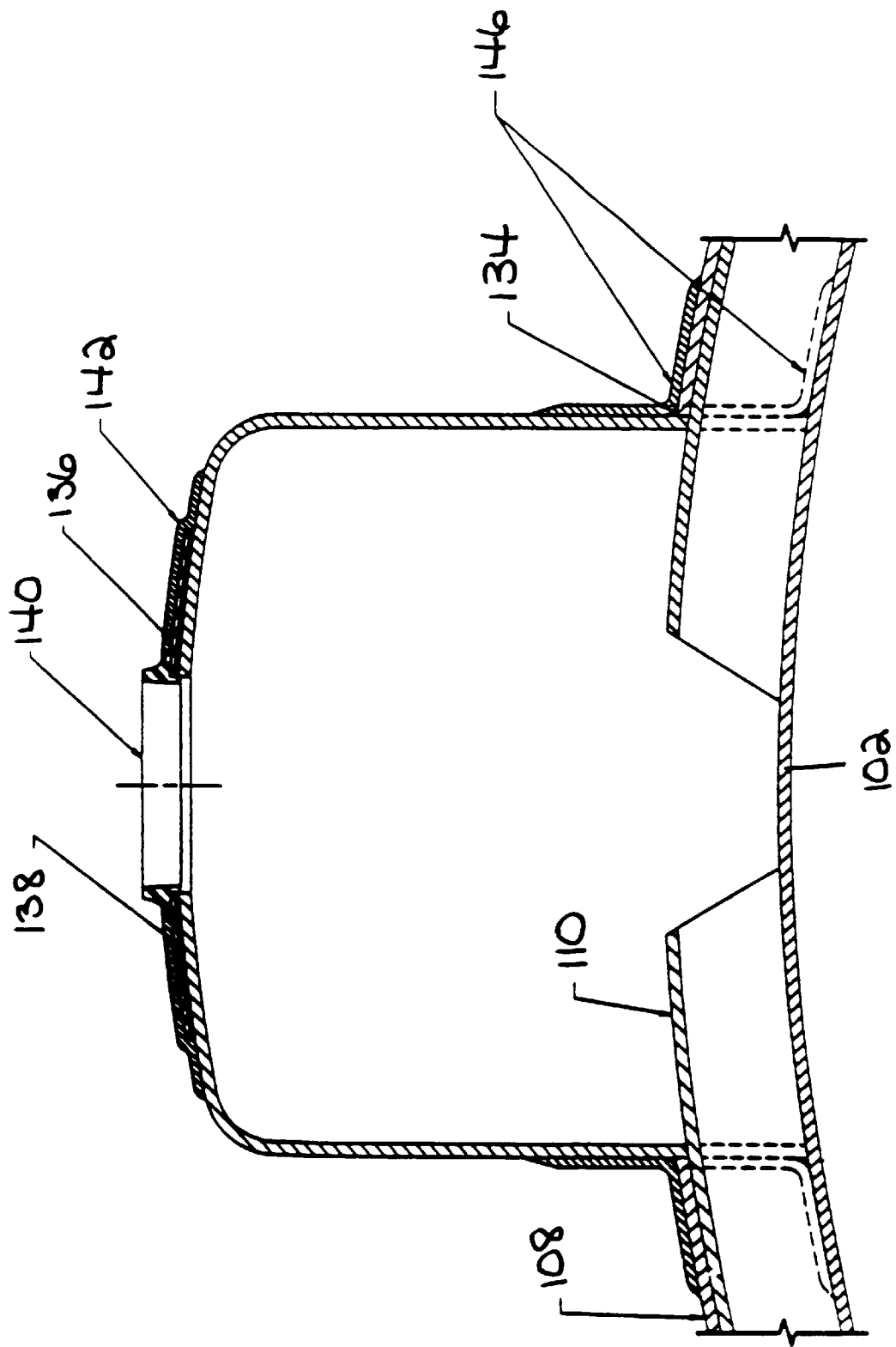

A similar reservoir, for annulus 104, is illustrated in FIG. 9, where like characters indicate like materials. Thus, a fitting 140, mounting plate 136 and mat and lay-ups 138 and 142 are provided identically. As with the reservoir for annulus 114, the reservoir for annulus 104 is adhered to outer wall 108 and inner wall 102 by wet lay-ups of resin impregnated glass fabric. At the corners, putty 134 is provided. The reservoir illustrated in FIG. 9 sits atop a rib cap, so that communication is directly with the interior of the rib, and thereby through the gutters with annular spaces throughout the tank between primary wall 102 and secondary wall 106. The connection between the reservoir and primary wall 102 is shown in phantom.

Figure 10:
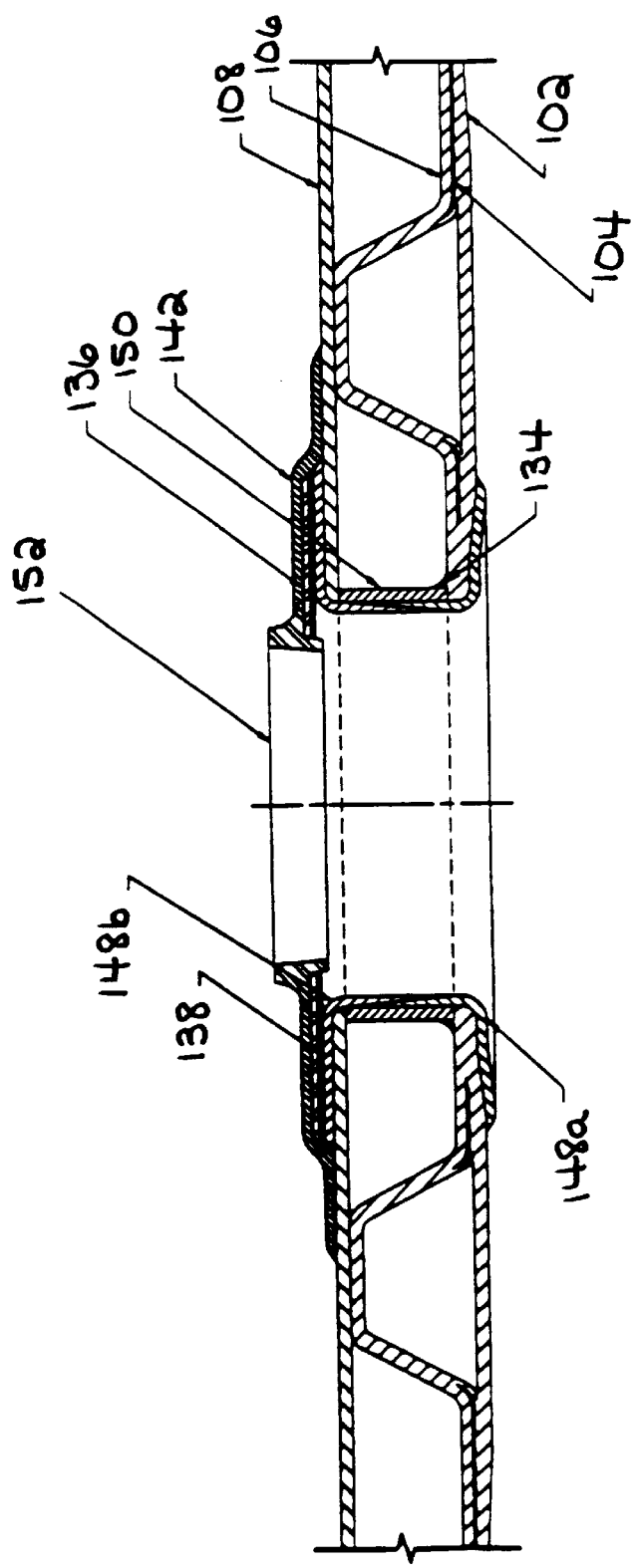
FIG. 10 is an illustration of a fitting providing in the first embodiment of the tank.

In addition to manways and reservoirs, tanks come provided with various fittings to permit the insertion of and communication with fill pipes, pump lines, pumps, vents, monitoring means and the like. A typical fitting installation for this embodiment of the invention is shown in FIG. 10. The installation of fitting 152 is essentially identical, except for size, to the application of the fittings to the reservoirs illustrated in FIGS. 8 and 9, including mounting plate 136 and lay-ups 138 and 142. The fitting is walled off by fiber reenforced plastic wall 150, which connects secondary wall 106 with tertiary wall 108. Fiberglass mat, impregnated with resin, is wrapped around primary wall 102 up the side of fitting wall 150, and then a similar mat lay-up 148b is wrapped over tertiary wall 108 and lay-up 148a, thereby effectively sealing off annulus 114 and annulus 104.

In an alternate embodiment of this invention, the tank is prepared entirely within the female mold, as two halves closed by a dome-shaped end and remaining, at the opposite end, open. In this case, the outer most wall becomes the first wall formed within the mold, and the exterior of the tank has a "corrugated" appearance caused by longitudinally spaced, circumferentially extending ribs. Because the tank structure is built inward, rather than outward, the interior of the tank is of slightly reduced diameter. This can be compensated for, to provide equal volume, by lengthening of the tank.

FIGS. 11A–G illustrate the formation of sequential layers of the tank of this embodiment of the invention. Because of the difference in appearance of this embodiment of Applicant's triple walled tank, different reference characters are applied to seemingly similarly structures. In both cases, however, a triple walled tank, with annular spaces between each two adjacent walls which permit the flow of liquid therein, is provided.

The tertiary and secondary walls of the tank, and annular space there between, together with the ribs therefore, in this embodiment of the tank may be built in a fashion identical to the first embodiment described above, and that disclosed in U.S. patent application Ser. No. 08/705,765. Thus, tertiary wall 202 is first formed, in a shape corresponding to the interior of the female mold, with ribs 204 and flats 206 integrally formed, preferably in a plurality of passes. Thereafter, annular material, which may be a mylar sheet, is applied to the flats, and subsequently, a uni layer 210 used to close off the bottom of rib 204. On the annular material and uni layer 210, secondary wall 212 is formed, by spraying FRP materials against these layers. Optionally, the annular material may be a force transmitting, strength sharing three-dimensional fabric which permits the flow of liquid therein, as described, infra.

At this point, rather than removing the tank from the mold, the tank is left inside the mold. Importantly, at this point, it is necessary to perform quality control to ensure no pin holes or delaminations have occurred. In alternative A described above, inspection can be easily and quicky done by "soaping" the inside and outside of the tank, applying a small degree of pressure, and detecting leaks or holes by bubbling. Soaping the inside of the tank within the mold is a difficult procedure. In one alternative, ultrasound, or other sound testing, can be used to detect inconsistencies in layer thickness, pinhole formation, or delamination. In an alternative embodiment, the open end of the half shell formed within the mold can be closed by application of a layer of FRP material, and a light vacuum drawn against annulus 208 by cutting a small hole in secondary wall 112 and applying vacuum there through. If the vacuum holds, no pinhole formation or delamination is observed. The closing layer of FRP is then removed.

After quality control has been completed, a second annular material 214 is applied. This may be a mylar film as described above. In the alternative, it may be a flow through material which provides for some strength sharing between the two walls, such as that disclosed in U.S. Pat. Nos. 5,020,358 and 5,017,044, incorporated herein by reference. In particular, a needled felt, such as that made available by Ozite Corporation under the mark Compozitex™ is suitable.

In an alternate embodiment, a three-dimensional fiberglass reenforced plastic, which "swells" or expands upon resin impregnation may be used, which material forms and cures, adhering to secondary wall 212. In this embodiment, annular material 214 is similar to that made available by Parabeam, as set forth in U.S. Pat. No. 5,534,318. This technology was originally developed in the United States by Xerxes Corporation. The entirety of the disclosure of U.S. Pat. No. 5,534,318 is incorporated herein by reference. Similar "three-dimensional reenforcing fabric, which is comprised of double pile cloth having spaced apart top and bottom cloths and binding threads there between", is available from Vorwerk of Europe. One suitable material is offered under the Mark TechnoTex. Another material that may be used is Flocore, as described in U.S. Pat. No. 5,522,340. Each of these materials is adhered to the interior of secondary wall 212 by resin, providing annular material 214. Primary wall 216, of FRP materials, is then sprayed up on the interior of annular material 214. The resulting structure provides a triple-walled "sandwich" with annular spaces provided between each two adjacent walls.

Figure 11:
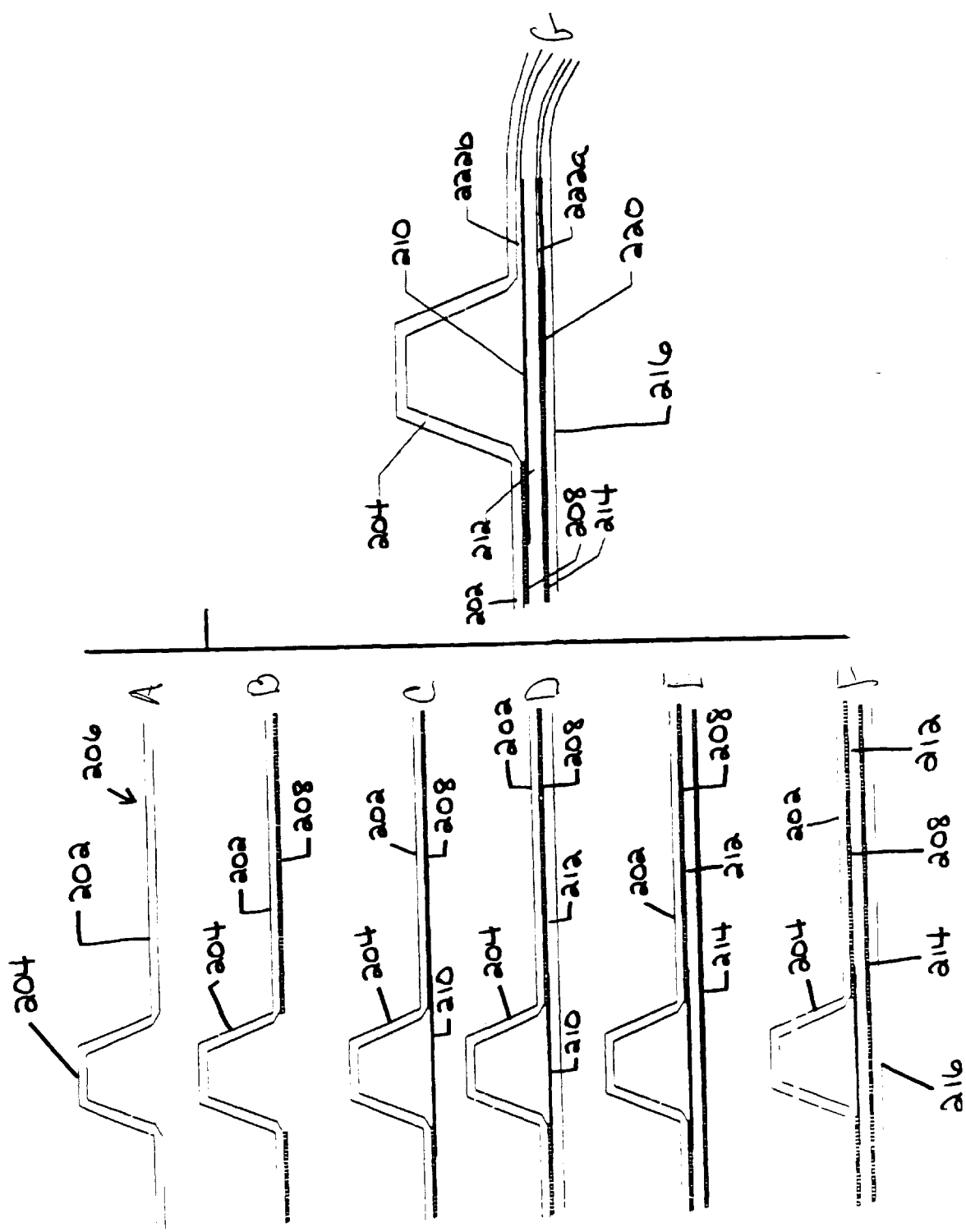
FIGS. 11A–G illustrate sequential formation of a tank according to a second embodiment of the invention.

The completed tank, illustrated at the juncture with the dome, is set forth in FIG. 11G. Thus, tertiary wall 202, provided with integral ribs 204 provides outside containment. Rib 204 is sealed off with uni layer 210 and annular material 208 provides fluid communication throughout the annulus between tertiary wall 202 and secondary wall 212. Annular material 214 lies between secondary wall 212 and primary wall 216, each of the walls being formed of FRP material. In place of the mylar employed, annular material 208 may also be a three-dimensional fabric, or other "strength-sharing" material which permits fluid flow there within. This is particularly in light of the fact that the hoop strength provided by ribs 204 can be more effectively communicated by such an arrangement, given that there is no co-cure or integral bond between tertiary wall 202 and secondary wall 212. As with the first embodiment discussed above, at point 220, the annular material 214 overlaps with the PVA/wax annular material at 222a and 222b, for both the inner and outer annulus at the dome. To provide improved communication, unidirectional glass may be applied over the terminus of annular material 214, so as to ensure that the PVA/wax combination does not penetrate the three-dimensional fabric.

Figure 12:
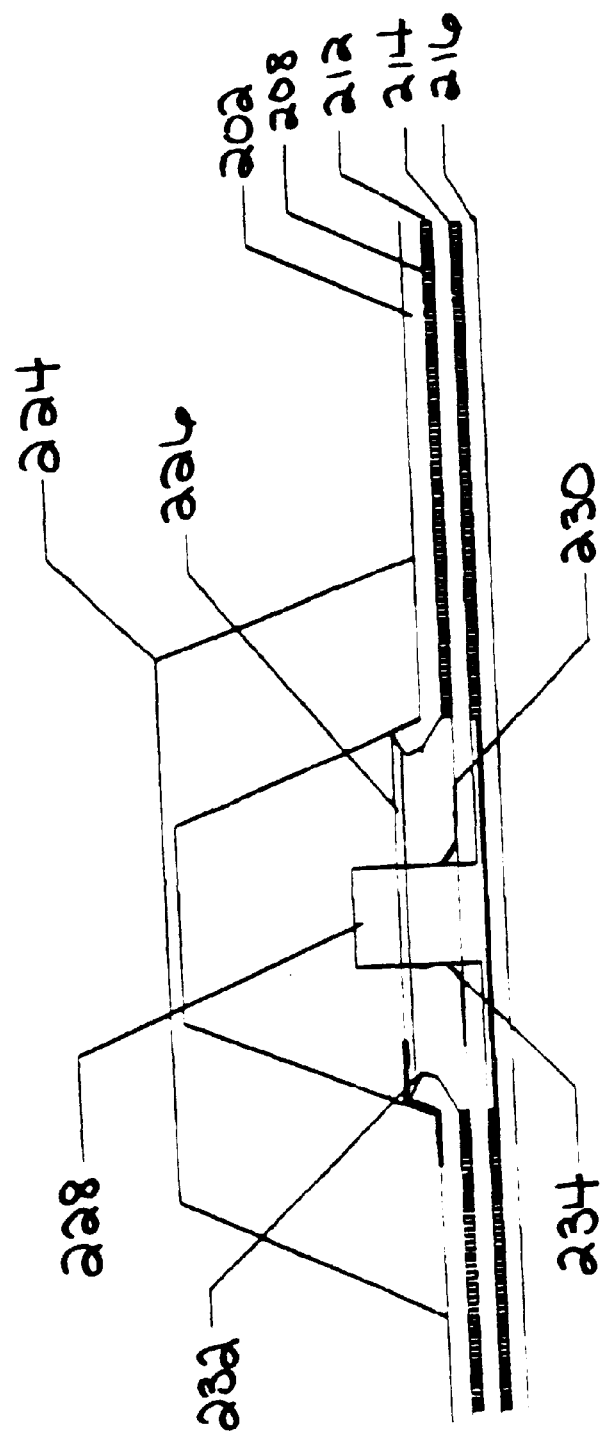
FIG. 12 illustrates a cross-section of a second embodiment of this invention, with a leak detection monitor for the primary annulus.
Figure 14:
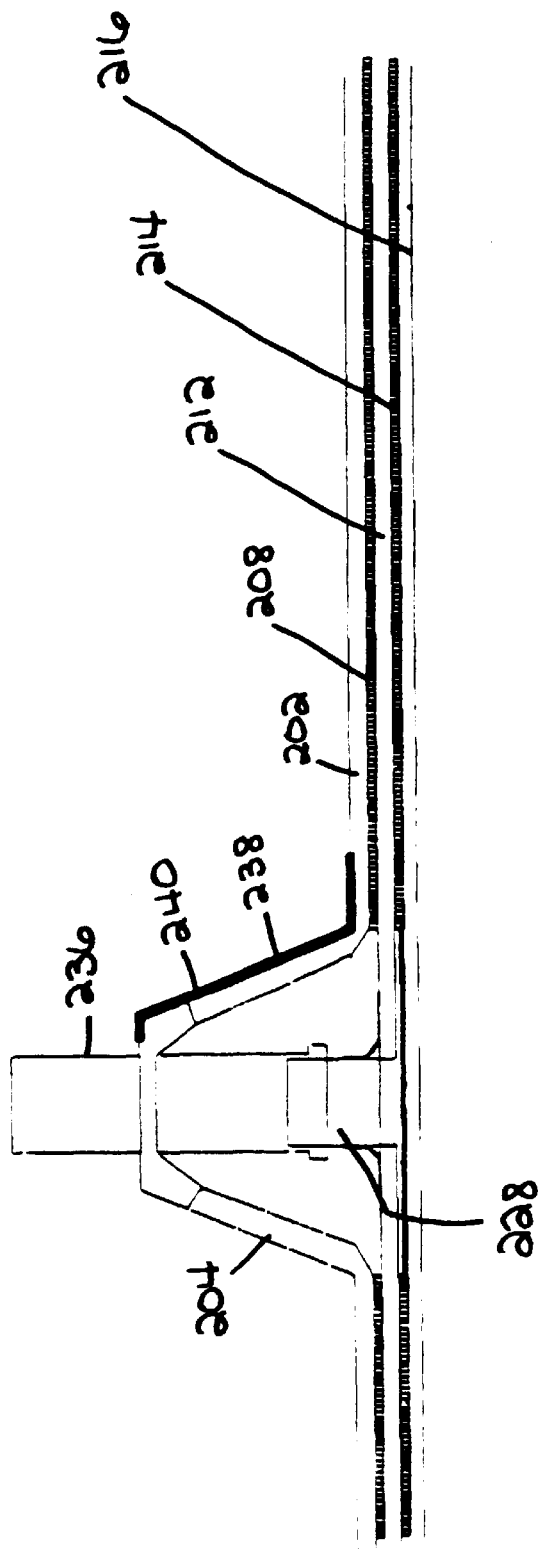
FIG. 14 illustrates a monitoring device for the secondary annulus of the tank, co-located with the monitoring device for the interior annulus.

Because both the annular space between the primary and secondary wall, and that between the secondary and tertiary wall, are quite small, both can be conveniently filled with brine or other liquid monitoring fluid. A monitor is provided in a fashion similar to that illustrated for the first embodiment described above. A monitoring fixture for monitoring the fluid level in annulus 214, between primary wall 216 and secondary wall 212 is illustrated in FIG. 12. Reservoir 224, formed of FRP materials, is made on a separate form and attached to tertiary wall 202, preferably at a rib. As before, a lay-up of fiberglass mat impregnated with resin is applied at 232 to bond the reservoir with the remaining rib. In this embodiment, an FRP disk 226 is provided, pre-fabricated, with a hole in the center to receive fiberglass coupling 228. The coupling 228 is also secured by lay-ups of resin impregnated mat 230, and provided with putty seam 234. The coupling 228 clearly communicates with the annulus 214. A dual-monitor, which also provides communication with annular space occupied by annular material 208 is shown in FIG. 14. In this case, a second monitor in coupling 236 is provided, which sits atop, and fits on, monitor 228. As shown, this communicates with the space within rib 204 and thus with the continuous annular space divided by annular material 208. The provision of a second monitor of this type may require a doghouse of greater height, which can be conveniently provided by extended top 240. As before, this is glassed in with wet lay-up 238.

Figure 13:
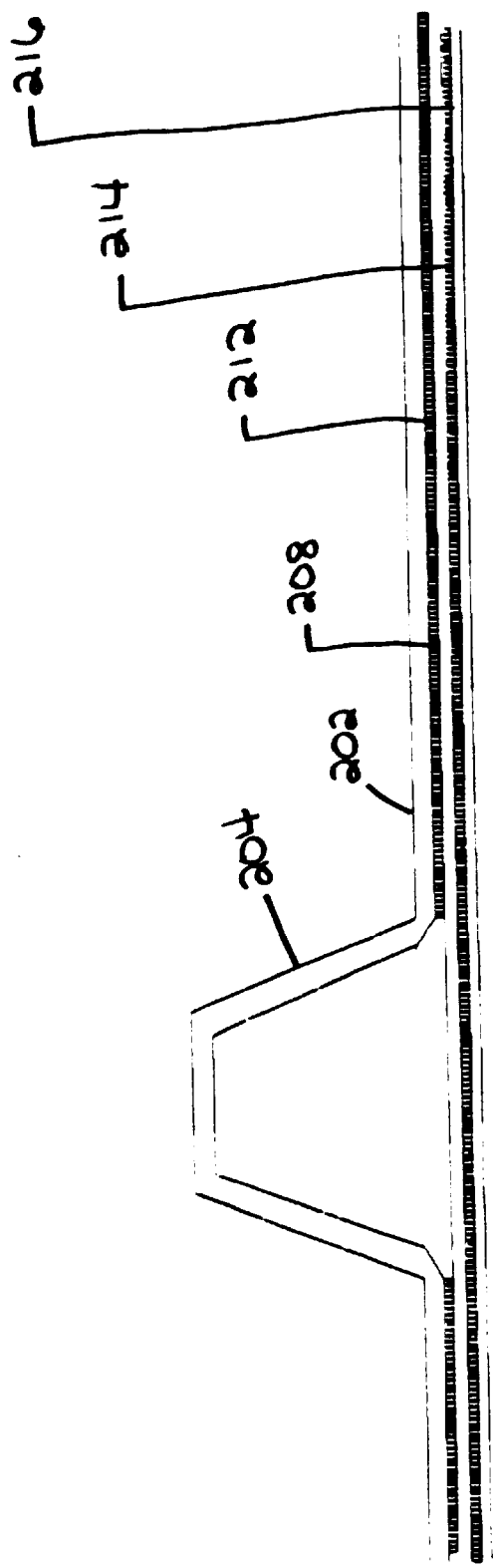
FIG. 13 illustrates a typical cross-section through a second embodiment of the tank.

A representative cross-section of this tank is illustrated in FIG. 13. The principle elements of the tank include outer wall 202 and circumferential rib 204. As illustrated in FIG. 13, both annulus 208 and 214 are made of materials which adhere to their adjacent walls, permitting the transmission of force, and strength sharing, there between. Thus, tertiary wall 202 overlays annular material 208, which is sandwiched by secondary wall 212. Annular material 214 is applied to the interior wall 212, with primary wall 216 being applied to the inward face of annular material 214.

The tanks of this invention may be installed singly, but are preferably part of a multiple installation. While tanks of superior strength and durability are provided, care and handling in installation, aspects which are beyond the scope of this invention, must be maintained, as with all underground storage tanks. The first embodiment of this tank provides for ease of manufacture and quality control. The second embodiment of the invention provides for entirely "in-mold" construction, and an annulus between the tertiary and secondary walls of reduced volume, making filling a the manufacturing site, rather than the installation site, possible. Both alternatives offer advantages which may be selectively employed, depending on the application of the tank to be made.

The invention has been described generically, and with reference to particular materials, shapes and structures. Alternatives will occur to those of skill in the art, particularly in the selection of annular materials, specific resins and fiber reenforcement, and the like, without the exercise of inventive faculty. Such alternatives remain within the scope of the invention, unless specifically excluded by the claims set forth below.

What is claimed is:

1. A triple-walled underground storage tank (UST) comprising:
   (a) a generally cylindrical primary wall adapted for the containment of liquid materials, terminating in two dome-shaped ends;
   (b) a secondary wall encircling substantially the entirety of said primary wall and providing secondary containment for said liquid material, wherein a first annulus is provided between substantially the entirety of said primary and secondary wall through which liquid may flow; and
   (c) a tertiary wall encircling substantially the entirety of said secondary wall and providing tertiary containment for said liquid materials, wherein a second annulus is provided between substantially the entirety of said tertiary and secondary walls through which liquid may flow;
   (d) wherein said first annulus and said second annulus are not in fluid communication with each other and a space interior to the primary wall wherein said liquid materials are contained; and
   (e) wherein the relationship between the primary wall and the secondary wall is such that fluid flow is permitted through substantially the entire first annulus, and the relationship between the secondary wall and the tertiary wall is such that fluid flow is permitted through substantially the entire second annulus and wherein at least one of said first annulus and said second annulus is substantially filled with monitoring liquid.

2. The UST of claim 1, wherein said primary, secondary and tertiary walls are comprised principally of fiber reinforced plastic (FRP).

3. The UST of claim 1, wherein said first annulus and said second annulus are provided with separate monitors for determining the formation of leaks in said walls.

4. The UST of claim 3, wherein said monitors comprise reservoirs formed of FRP and adhered to said tertiary and secondary walls.

5. The UST of claim 1, wherein said tank is built wholly within a female mold, and said tertiary wall is comprised of ribs formed integrally with said tertiary wall.

6. The UST of claim 1, wherein said first and second annulus are comprised of materials adhered to said walls on either side of said annulus, and through which fluid may flow.

7. The UST of claim 6, wherein said annular material of at least one of said first and second annulus is comprised of a three-dimensional fiberglass fabric impregnated with resin.

8. The UST of claim 7, wherein both said first and second annular materials are comprised of three-dimensional fabric comprised of fiberglass impregnated with resin.

* * * * *

UNITED STATES PATENT AND TRADEMARK OFFICE
CERTIFICATE OF CORRECTION

PATENT NO. : 6,698,610 B2
DATED : March 2, 2004
INVENTOR(S) : Robin Berg et al.

It is certified that error appears in the above-identified patent and that said Letters Patent is hereby corrected as shown below:

Column 2,
Line 13, "tanks is" should read -- tanks are --.

Column 4,
Line 12, "FIG. 3 is a illustration" should read -- Fig. 3 is an illustration --.

Column 8,
Line 15, "that is a wet to annulus," should read -- that is a wet annulus, --.

Column 11,
Line 24, "making filling a the" should read -- making filling at the --.

Signed and Sealed this

Twentieth Day of July, 2004

JON W. DUDAS
*Acting Director of the United States Patent and Trademark Office*